United States Patent
Cano et al.

(10) Patent No.: US 9,552,738 B2
(45) Date of Patent: Jan. 24, 2017

(54) SYSTEMS AND METHODS FOR COMPUTER-BASED TESTING

(71) Applicant: Educational Testing Service, Princeton, NJ (US)

(72) Inventors: Diana Wright Cano, Princeton, NJ (US); John Rumianowski, Levittown, PA (US); Andy Castro, Hamilton, NJ (US)

(73) Assignee: Educational Testing Service, Princeton, NJ (US)

(*) Notice: Subject to any disclaimer, the term of this patent is extended or adjusted under 35 U.S.C. 154(b) by 343 days.

(21) Appl. No.: 13/804,566

(22) Filed: Mar. 14, 2013

(65) Prior Publication Data

US 2013/0266926 A1     Oct. 10, 2013

Related U.S. Application Data

(60) Provisional application No. 61/619,987, filed on Apr. 4, 2012.

(51) Int. Cl.

| | |
|---|---|
| G09B 7/00 | (2006.01) |
| G06F 21/53 | (2013.01) |
| G06F 21/71 | (2013.01) |
| G06F 21/62 | (2013.01) |
| G06F 12/14 | (2006.01) |
| G06F 21/52 | (2013.01) |
| G06F 21/50 | (2013.01) |
| G06F 9/445 | (2006.01) |

(52) U.S. Cl.
CPC . *G09B 7/00* (2013.01); *G06F 8/61* (2013.01); *G06F 12/1458* (2013.01); *G06F 21/50* (2013.01); *G06F 21/52* (2013.01); *G06F 21/53* (2013.01); *G06F 21/629* (2013.01); *G06F 21/6218* (2013.01); *G06F 21/71* (2013.01); *G06F 2221/2149* (2013.01)

(58) Field of Classification Search
USPC .......................................... 434/362
See application file for complete search history.

(56) References Cited

U.S. PATENT DOCUMENTS

| | | | |
|---|---|---|---|
| 7,069,586 B1* | 6/2006 | Winneg et al. | 726/16 |
| 2004/0198335 A1* | 10/2004 | Campen | 455/419 |
| 2005/0186549 A1* | 8/2005 | Huang | 434/322 |
| 2005/0252963 A1* | 11/2005 | Adams et al. | 235/382 |
| 2008/0104618 A1* | 5/2008 | Rogers et al. | 719/328 |
| 2009/0087827 A1* | 4/2009 | Goldburd | G09B 7/06 434/362 |

(Continued)

*Primary Examiner* — James Hull
(74) *Attorney, Agent, or Firm* — Jones Day

(57) ABSTRACT

Systems and methods are provided for administering a test using an electronic device. The electronic device is registered to a test-taker, where the registering includes receiving identifying information from the test-taker and associating the electronic device with the test-taker using the identifying information. The test is stored in encrypted form on the electronic device, and the test includes a test question. The test is decrypted prior to test administration. The test is administered to the test-taker via the electronic device, and the administering includes displaying the test question on the electronic device and receiving an answer to the test question on the electronic device. The administered test is removed from the electronic device after transferring the answer to a testing service.

34 Claims, 5 Drawing Sheets

(56) References Cited

U.S. PATENT DOCUMENTS

| | | | |
|---|---|---|---|
| 2009/0265214 A1* | 10/2009 | Jobs et al. ..................... | 705/10 |
| 2009/0292487 A1* | 11/2009 | Duncan et al. ................ | 702/63 |
| 2010/0260476 A1* | 10/2010 | Cloutman ............... | G06F 21/10 |
| | | | 386/248 |
| 2013/0078605 A1* | 3/2013 | Toussaint, Jr. ........... | G09B 7/02 |
| | | | 434/362 |

* cited by examiner

SYSTEMS AND METHODS FOR COMPUTER-BASED TESTING

CROSS REFERENCE TO RELATED APPLICATIONS

This application claims priority to U.S. Provisional Patent Application No. 61/619,987 filed Apr. 4, 2012, and entitled "Systems and Methods for Computer-Based Testing, the entirety of which is herein incorporated by reference.

TECHNICAL FIELD

The technology described herein relates generally to test administration and more particularly to systems and methods for administration of a test using an electronic device.

BACKGROUND

As education pushes for more authentic measures of 21st century skills, limitations in the technology available in schools may hamper these pursuits. Many schools lack sufficient numbers of computers, and the goal of having a computer available for each student continues to be unachievable in most schools across the country. Due to the lack of computers, standardized tests (e.g., the SAT Reasoning Test) may be administered in schools at a volume that is higher than the number of computers available during the administration. Because of this, standardized tests have been held back from being able to deliver innovative, computer-based assessments that could provide a better measure of students' skills. Pilot programs that allow for students to bring their home laptops to schools may show promise, but these resources are not available to all students, and the operational needs of this model may be much higher than the traditional, paper-and-pencils-based assessment.

SUMMARY

The present disclosure is directed to systems and methods for administering a test using an electronic device. The electronic device is registered to a test-taker, where the registering includes receiving identifying information from the test-taker and associating the electronic device with the test-taker using the identifying information. The test is stored in encrypted form on the electronic device, and the test includes a test question. The test is decrypted prior to test administration. The test is administered to the test-taker via the electronic device, and the administering includes displaying the test question on the electronic device and receiving an answer to the test question on the electronic device. The administered test is removed from the electronic device after transferring the answer to a testing service.

DETAILED DESCRIPTION

Computer-based testing (e.g., where students take a test using a laptop computer, tablet computer, smart phone, portable gaming system, desktop computer, computer terminal, or other computationally-enabled electronic device) may be used to better assess test-takers' skills, as compared to paper-and-pencil-based testing. By utilizing technological capabilities of a computer device, a more rich, interactive, and stimulating testing experience may be provided to the test-taker. Further, many test-takers, familiar with computer technology, online social networks, and interactive audio-visual displays, expect a customized view of relevant content that is not provided with a test booklet and a paper bubble sheet.

Figure 1:
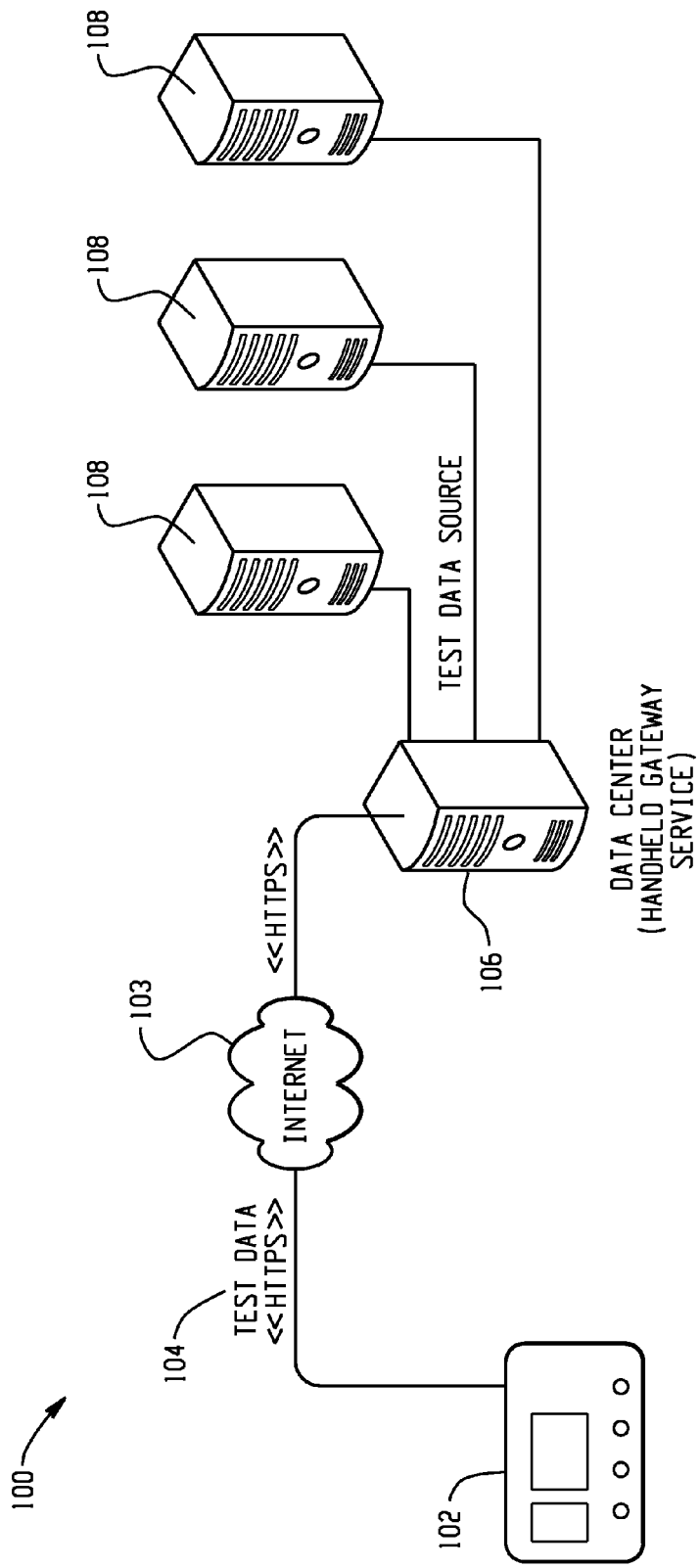
FIG. 1 depicts an example computer-based testing architecture.

FIG. 1 depicts an example computer-based testing architecture 100. Under the example architecture, tablet computer 102 may be issued to test-takers prior to a test session, or test-takers may be required to provide their own tablet computer 102 or other computing device. The tablet computer 102 may be used to effectively replace the test booklet, pencils, and bubble sheets traditionally associated with testing. Thus, the tablet computer 102 may be used to provide test questions to the test-taker and to receive responses to the test questions from the test-taker. Although the example of FIG. 1 describes use of the tablet computer 102 as the device on which the test is taken, a laptop computer, tablet computer, smart phone, portable gaming system, desktop computer, computer terminal, or other computationally-enabled electronic device may be used in place of the tablet computer 102.

To authenticate the test-taker prior to test administration, a registration process may be used. The test-taker may register his or her tablet computer 102 by providing personal identity information and additional security-question information that may be used to validate the test-taker's identity prior to taking the actual test. The additional security-question information may be similar to information commonly required by lost or forgotten password measures (e.g., mother's maiden name, father's middle name, first pet's name). Upon registration and entry of the test-taker's personal identity information, the tablet computer 102 may become associated with the test-taker and henceforth non-transferable. After registering, the test-taker may be allowed to become acclimated with the tablet computer 102 and its functionality prior to the actual test session. This acclimation period may also allow the test-taker to take sample tests that may provide the look and feel of the actual test.

Prior to the test session (e.g., 24 to 48 hours prior to the test session), the tablet computer 102 may download an encrypted test package from the Internet 103 (e.g., while connected to a local WiFi Internet connection or a cellular carrier network). The encrypted package may contain test data 104 that may be protected from tampering by means of an encryption algorithm (e.g., 256 bit encryption or more) requiring a private key to unlock and allow the test to be taken. The test data 104 may be provided over the Internet 103 from a data center (e.g., handheld gateway service) 106. The data center 106 may receive test data from one or more test data sources 108. Once the test data 104 is downloaded onto the tablet computer 102, a built in time/battery life application may be launched to clearly indicate battery status and to remind the test-taker that the tablet computer 102 must be fully charged the night before the testing session (e.g., using an audible alarm). This may help to ensure that the tablet computer 102 has enough battery life to complete the test on the actual test day. Alternatively, the battery life application may function at all times (e.g., prior to downloading the package) but may only include the charging reminder closer in time to the test session. Upon download of the test data 104, Internet connectivity and any other non essential functionality of the device 102 may be disabled for further security. A means of detecting tampering may be incorporated into the tablet computer 102, such that if tampering with the test data 104 is detected, the test data 104 is configured to self delete and render the tablet computer 102 unusable. The tablet computer 102 may also maintain a log configured to determine the method of tampering.

Near the time when the test is to begin (e.g., several minutes to several hours before), a proctor may be emailed a new private decryption key specific to the test that day, which may be provided to test-takers just before testing is to begin (e.g., several minutes). Upon inputting the proctor-provided encrypted key, a screen may then be displayed on each tablet requesting answers to security questions that were provided by the test-taker at the initial device registration time (e.g., mother's maiden name, father's middle name, first pet's name). More robust security information may also need to be input (e.g., face recognition data, retina scan data, fingerprint data). Once this information is correctly entered, the test-taker may be allowed to begin the test. Thus, the test-taking portion of the computer-based model may not require an Internet connection: after the test is downloaded, the test-taker may only need to be provided with the proctor-provided decryption key to take the test, and taking the test may not require an Internet connection. The test may be viewed and completed using an application that runs within a web browser or via a standalone (native) application. All question types (e.g., selected response items and constructed response items) may be ported to the digital format.

After the test-taker has completed the test or after an allotted amount of time has been exceeded, the test package may automatically close and re-encrypt itself with a new, unknown private key, disallowing the test from being re-opened by the test-taker. Once the package is re-encrypted, all of the disabled functionality of the tablet may be restored back to its original, pre-test state. At the first opportunity following the test, the tablet computer 102 may connect to the Internet 103 and upload the test package to the data center 106 or a different server maintained by a testing service. Once the package is uploaded, it may delete itself from the tablet computer 102, leaving no remains of the test contents. Authorized entities may receive the uploaded package, use a decryption key to open it, and provide further validation, scoring, and notification services (e.g., notifying the test-taker of his or her score via email or traditional mail). As illustrated in FIG. 1, all communications over the Internet may be made using the Hypertext Transfer Protocol Secure (HTTPS) protocol for added security. Results may be delivered in a secure manner near real time or within a specified time period. The results may be reported back to the electronic device 102 used to take the test.

The computer-based testing architecture example of FIG. 1 illustrates use of a totally digital interface for test-takers to register, test, and receive score reports. The digital interface may reflect prevailing consumer technology of the time, such that test-takers may easily interact with the interface in the first instance. The digital interface may be user-friendly and may enable educational functions not possible under the paper-and-pencil-based model.

Changes Required to Implement the Digital Testing Interface

Changes may be required to implement the digital testing interface. For example, test center administrators may need to be trained on new methods for checking test-takers in and out of test centers. Rosters and seating charts and tasks related to rosters and seating charts may also incur changes with the implementation of the digital interface. Loaner electronic devices may need to be available for test-takers who have forgotten to bring or charge their devices. Further, heightened technical support may need to be made available on test day (e.g., to answer questions regarding a device's failure to load content for testing). Similar support would also need to be available on non-test days as test-takers prepare for future assessment.

To ease the transition to the digital interface, a bimodal delivery of the test using a phased approach may be pursued initially (e.g., where some test-takers complete the test using pencil and paper, while others complete the test using the electronic device). This phasing may allow for development and field testing of innovative items that make use of the digital delivery and allow for any issues to be resolved before the digital interface is required for all test-takers.

Electronic Device Characteristics

It may be preferable for test-takers to receive the electronic device used to take the test for free or at a low cost. This may be accomplished through development of an advertiser-subsidized, deeply discounted tablet device (e.g., priced less than $100) that test-takers can purchase to serve as both a personal entertainment device and an educational tool for school use. During personal use, advertisers (e.g., Coca Cola, Nestle, Hasbro, Verizon) can deliver advertisements to the device highlighting their products and services. These advertisements may be tailored to the target demographic market (e.g., 16-19 year old students). During school use, advertisements may be suppressed and students may have access only to educational services on the device. The advertisements may subsidize a number of costs (e.g., Internet connectivity services and the tablet itself). The approach may be similar to initiatives pursued by some businesses, whereby employees are allowed to use their own personal devices to enhance productivity while reducing the amount of computing equipment that businesses must provide to employees. In another example, however, the device may be used only for testing and test preparation purposes and not for entertainment purposes. In another example, the test-taker may be required to purchase both the device and Internet connection, such that no computing or networking infrastructure is required at the school or exam room. In this example and in general, the computer-based testing model may place fewer requirements on schools than paper-based assessment counterparts (e.g., no pencils or booklets to hand out, collect, ship). The computer-based model may lessen burdens on schools while enabling a much richer assessment option capable of measuring additional dimensions of student knowledge and skills and providing better diagnostic information to teachers, parents, and students.

The electronic device may need to be enabled with a number of features specific to the computer-based testing model. For example, after test answers have been input to the device, the test answers may need to be persistent across a power outage, battery failure, or any other unplanned personal device shutdown. Further, test items and test item answers may need to be secure in case the personal device is lost or stolen prior to test item answer transmission. The electronic device may also be enabled to automatically transmit test item answers for scoring upon completion of the test at the first moment that an Internet connection is detected. Test item answer transmission may require a full automatic restart capability to allow for intermittent Internet connectivity. The complete removal of all test items, test item answers, and database logs may be enabled to occur automatically upon the successful transmission of all test item answers.

As described above, the electronic device may be a laptop computer, tablet computer, smart phone, portable gaming system, desktop computer, computer terminal, or other computationally-enabled electronic device. In one example, the Blackberry Playbook may be used as the electronic device. The Blackberry Playbook weighs less than one pound and may be viewed as a good alternative to carrying heavy books and test prep materials. The device has a 7 inch display that supports 4-finger multi-touch and gesture controls. The surrounding area around the display is touch-enabled and may be taken into consideration when designing the user interface of the application. The Playbook also has a 3 megapixel front camera and a 5 megapixel rear camera that may be used as a security feature for facial recognition.

The test-taker experience may be a key component to the success of the computer-based testing architecture. Test-takers may be more willing to embrace a device that is simple and intuitive. The user interface of the electronic device may incorporate a number of gestures with which test-takers are already familiar. For example, a test-taker can use the "pinch to zoom" gesture to increase the size of the document or use a finger swipe motion to change a page. Further, an area around the display may be used to trigger a hidden menu where test-takers can access a notepad or a calculator. The test-taker may be given an option of typing in landscape or portrait mode.

Test Delivery and Submission Infrastructure

Providing test packages for download and receiving and processing the results may present computing challenges. These challenges may be even greater when using the computer-based model for large, standardized tests (e.g., the SAT Reasoning Test). Such standardized tests may be taken by large numbers of students simultaneously, which may put stress on an infrastructure. A cloud-based system for the provision and receipt of testing data may be implemented (e.g., a private cloud model or a public cloud model such as Amazon Web Services). Alternatively, non-cloud options may be pursued (e.g., scaling up computing resources at a particular computing center to meet peak load processing demands). Non-cloud options may include a multiple data center model, to provide redundancy and/or to provide a true distributed application. The pipeline may be the restricting or limiting factor, such that the size of the pipeline may drive the amount of traffic and in turn the amount of computing resources required under peak load.

The computing challenges may be further heightened by a number of factors. For example, the test-taker will need the latest test package prior to test administration, but it may be preferable to provide the packages as close to the test administration as possible to reduce chances of the test being "hacked" or decrypted prior to the test administration (in the pencil-and-paper-based model, test books may be shipped several days prior to the exam). A tight release schedule may translate into much traffic. Computing challenges may also be created by a need to have all test answers promptly communicated back to the testing service. Prompt communication of test answers may be required so that scores can be processed and any problems with devices can be addressed.

Application Architecture

Figure 2:
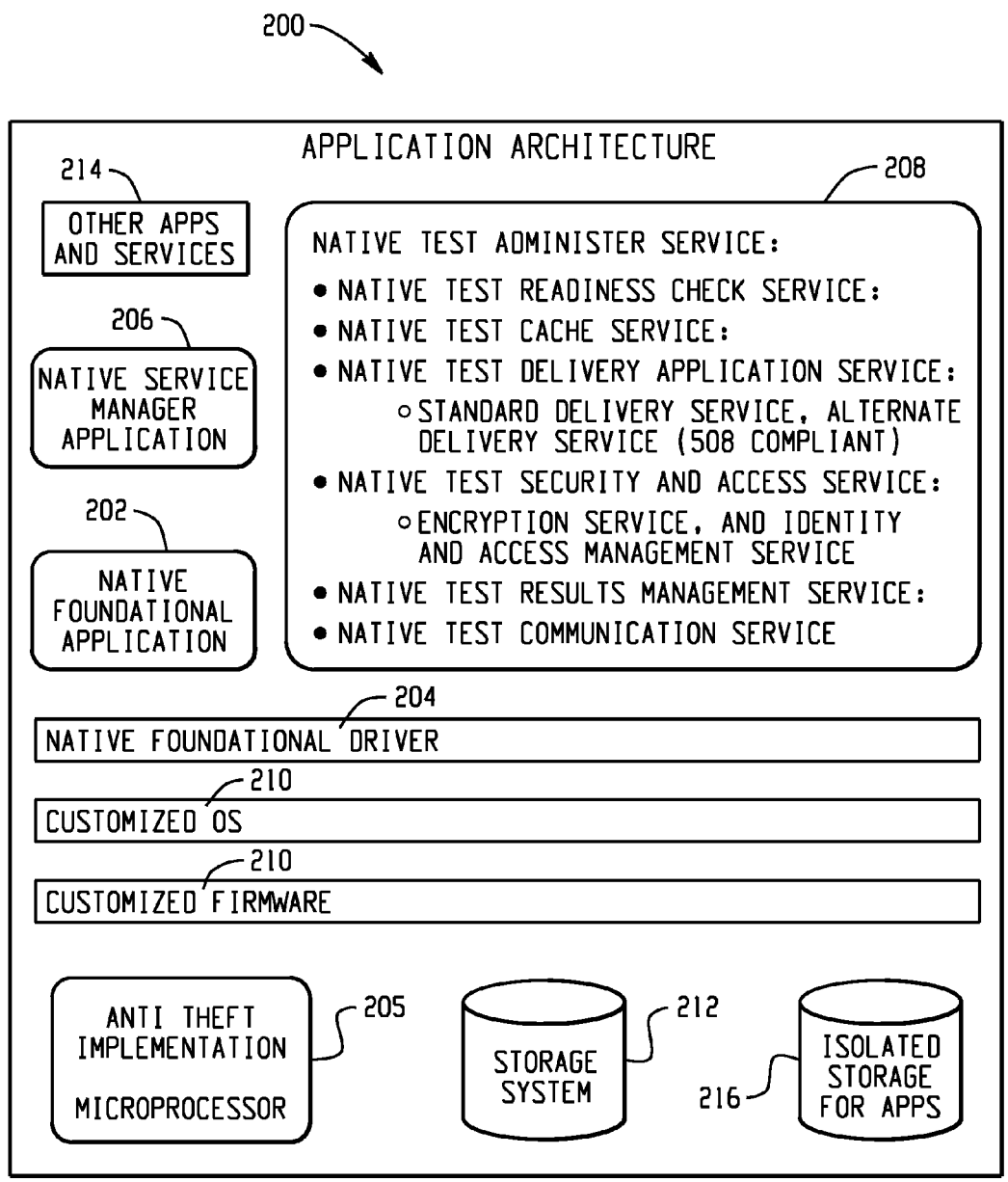
FIG. 2 is a diagram illustrating an example application architecture for a computer-based testing architecture.

FIG. 2 is a diagram illustrating an example application architecture 200 for a computer-based testing architecture. A test delivery application solution may include four major client components and at least one server component. In the example of FIG. 2, all client applications and services are executed as native applications (i.e., a standalone program that is not supported to run within a web browser). In FIG. 2, client applications include a native foundational application 202, a native foundational driver 204, a native service manager application 206, and a native test administration service 208. Customized OS and customized firmware (BIOS) software 210 may also be developed for the computer-based testing architecture.

The native foundational application 202 may be configured to act as a playground for a testing service to deliver its applications (e.g., high stakes and low stakes tests, registration, score report, promotional offers and advertisements) on the device. The native foundational application 202 may serve as a first-level secured interface from which other client services of the testing service may be accessed. The application may be installed at the testing service's facility and registered with a unique test-taker ID mapped to a unique ID of a device. Test-takers may not be able to delete this application, and this application may automatically synchronize with back end services of the testing service for upgrades, patch updates, and other configuration data updates. Test-takers may be required to register devices with the testing service's back end system before use. Test-takers may be able to reinstall the native foundational application 202 only with authorization of the testing service's help desk. Test-takers may be authorized by the help desk to reinstall this software after a proper security check that may include answering sufficient challenge questions that were captured during the user and device registration.

The native foundational driver 204 may be used to allow the testing service to have firmware and OS-level control over the electronic device. The native foundational driver 204 may mandate certain changes to the firmware of the device for implementing security and reliability. The driver 204 may enhance microprocessor level antitheft security 205 and OS-level security to avoid unauthorized activation of the device. The driver 204 may also be used to prevent use of certain applications in unapproved locations and situations and to lock the device from further use in these locations and situations. Along with the native foundational driver 204, the native service manager application 206 may be used for security-related applications. The application 206 may be used to provide second-level, highly secured access to client services of the testing service. Client software services of the testing center may be accessed only through the native service manager application 206.

The native test administer service 208 may be used to provide a variety of services that may be invoked only by a test administration service to administer a test. The services of the native test administer service 208 may include a native test readiness check service, a native test cache service, a native test delivery application service, a standard delivery service, an alternate delivery service (e.g., 508 compliant), a native test security and access service, an encryption service, an identity and access management service, a native test results management service, and a native test communication service.

A server component 212 may include a handheld gateway back-end server. The purpose of this application may be to provide a secured abstracted gateway for authorized handheld clients to access the testing service's back end services. This layer may implement a high security check before allowing a client device to access the testing service's back end services and data.

Other applications and services 214 may be part of the application architecture 214, and these applications and services 214 may be stored on servers configured to provide isolated storage for applications 216. Development of applications may require a number of different approaches and programming languages. For example, driver implementation may require native C/C++ programming. For some applications, existing code may be re-used. For other applications, new code may need to be developed. For example, Adobe AIR may be used to implement new client applications. Although the example architecture of FIG. 2 includes only native applications, other application architectures may use applications configured to run in a browser window.

External Systems and Infrastructure Services

The computer-based testing architecture may use a number of interfaces to external systems or procedures. For example, WiFi and/or cellular carrier connectivity may be used for downloading and uploading tests and training materials. As another example, with many electronic devices' built-in GPS capabilities, the test-taker's location may be detected, such that a check-in process can begin as soon as the test-taker arrives at the test site.

Infrastructure services may be primarily comprised of identity management, collaboration, and content management technologies. Identity management services may be used to accommodate built-in authentication services on the hardware testing device. Identity management technologies may capture "basic" information on the test-taker to facilitate login for registrations and self-service, and the technologies may include retina scanning, finger printing, and facial recognition. The authentication technology on the hardware testing device may be used to improve the current test-taker photo ID manual authentication process. Collaboration and content management technology within the electronic device may be used to take full advantage of content delivery in rich media types including video and audio. Transitioning a test to electronic delivery may provide an environment fostering innovation for test creators.

Data Model for Data Content

In terms of data content itself, a data model to support it may include entities to identify a test administration, a testing location, a test, all test items for the test, an answer for each test item, and a test-taker. The attributes for each entity may be restricted to only those attributes that would be required to take the test itself. For example, the test-taker entity may not contain any personally identifiable information (PII), but may include an ID that is internal to the testing service so that the test-taker can be identified once the data is transmitted back to the testing service for processing. The number of entities and attributes may be limited for a number of reasons: 1) security (i.e., a smaller amount of data stored may lower security risk exposure), and 2) data transmission performance (i.e., it may be quicker to deliver the test and transmit the data back to the testing service once the test has been completed if the data model is smaller).

Data access and storage technology may be selected with security and data transmission performance metrics in mind. Thus, the data access and storage technology may be selected to meet the following technical requirements: (1) data encryption for data at rest as well as data being transmitted; (2) data activity logging that allows for automatic transaction-level recovery; (3) message-based data replication that is automatically recoverable across a personal device shutdown, battery failure, or intermittent internet connectivity; (4) self-maintaining transaction logs that prevent log files from filling up the disk and that are deleted upon the successful replication of all test item answers; (5) external or internal trigger mechanisms that can be used to fully truncate all data in the data store upon the successful replication of all test item answers; (6) an easy to use data access/update language, such as SQL; (7) fully embeddable within an application delivery package so that the application delivery mechanism is as simple as possible and the technology as well as the data model are in complete synchronization with the application itself; (8) security at the data object level, such as "grant," so that database objects can be secured to the test-taker only when the testing package is delivered to the personal device; (9) it may be deployable across as many of the major personal device operating systems as possible (e.g., Android 4.0, iPAD OS 4.0, Playbook OS 2.0, and Windows 8).

Provisions for Safety, Data Integrity, Security, and Continuity of Operations

Test-takers may attempt to unlock the electronic device and tap into the underlying operating system (a process known as "jailbreaking" or "rooting"). In case a test-taker does manage to jailbreak the device, the device may include an application to detect this. This application may continuously maintain a status of the security of the device and may be used for other security-related purposes. For example, the test-taker may only be allowed to take the test when the application determines that the device is in a secure state. Upon completion of the test, the application may upload the test and results to a server and wipe all test data from the device.

Another security issue inherent in testing on a tablet or other electronic device may be the risk of having test-takers cheat by simply looking at another test-taker's device. Text on a tablet may be easier to read at a distance than text on paper is. To address this issue, an adhesive privacy screen that drastically reduces the viewing angle of the display may be required. This may allow a test to be held in any classroom, eliminating a need for partitions.

Other security-related features may be enabled. Network connectivity may be disallowed and not required during the test session. Proprietary encryption may be used to protect the downloaded test package with self destructing/deleting protection in the event of package tampering. Upon downloading the test package, a timer may be activated, and if the test is not activated at a sponsored test session within a given timeframe (e.g., 24 to 48 hours), the test package may self destruct/delete. Multiple versions of the test package may be randomly deployed. The capability of remotely wiping or locking the entire device in cases of theft or tampering may be enabled. The electronic device may be modified with a custom ASIC (application-specific integrated circuit) to increase security and reduce the possibility of reverse engineering by using a non-testing-service specific electronic device. The electronic device may be modified to include military-grade "cryptochip" type technology (e.g., similar to technology used in the "Ironkey" thumb drive) to reduce or prevent tablet hardware from being hacked. In the event that tablet hardware is compromised the entire tablet may be rendered useless.

In addition to device and network security, the testing software application may need to be engineered for security. Software patches and upgrades may be provided automatically. Anti-virus software may be provided, and a full anti-virus scan may be required before a test. White list services, processes, and/or applications may be loaded during the test. An application may be used to provide a timed test token required to launch or restart a test. Applications may be used to control user access. Software may be used to remove and lock all endpoint device interfaces. Isolated storage may be sanitized after successful completion of the test. All testing software and test materials may be geo-coded and time bound, such that if the device is moved out of an approved location or if time expires, the test software and test materials will be wiped off from the device. If a test is scheduled and the device is loaded with test materials, then the device may be locked to test mode until the test is completed successfully, the results have been uploaded to the testing service's back end systems, and the test materials have been removed from the device. A number of these software-related security measures may require the testing service to establish a built-in mobile network plan.

Figure 3:
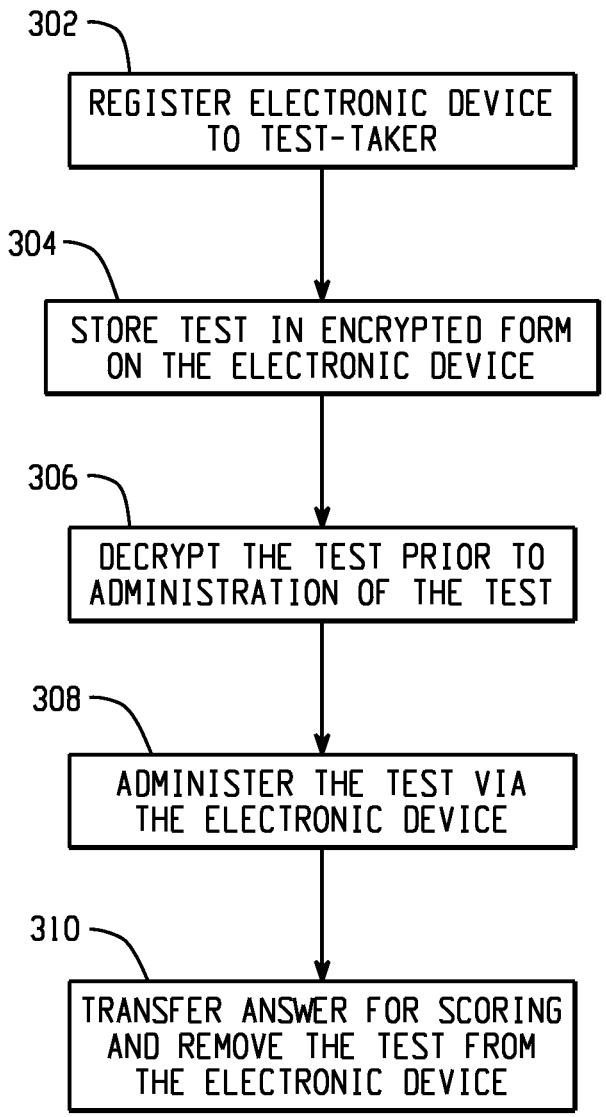
FIG. 3 is a flowchart illustrating an example method of administering a test using an electronic device.

FIG. 3 is a flowchart illustrating an example method of administering a test using an electronic device. At 302, the electronic device is registered to a test-taker. The registering includes receiving identifying information from the test-taker and associating the electronic device with the test-taker using the identifying information. At 304, the test is stored in encrypted form on the electronic device, where the test includes a test question. At 306, the test is decrypted prior to administration of the test. At 308, the test is administered via the electronic device. The administering includes displaying the test question on the electronic device and receiving an answer to the test question on the electronic device. At 310, the administered test is removed from the electronic device after transferring the answer to a testing service.

Figure 4A:
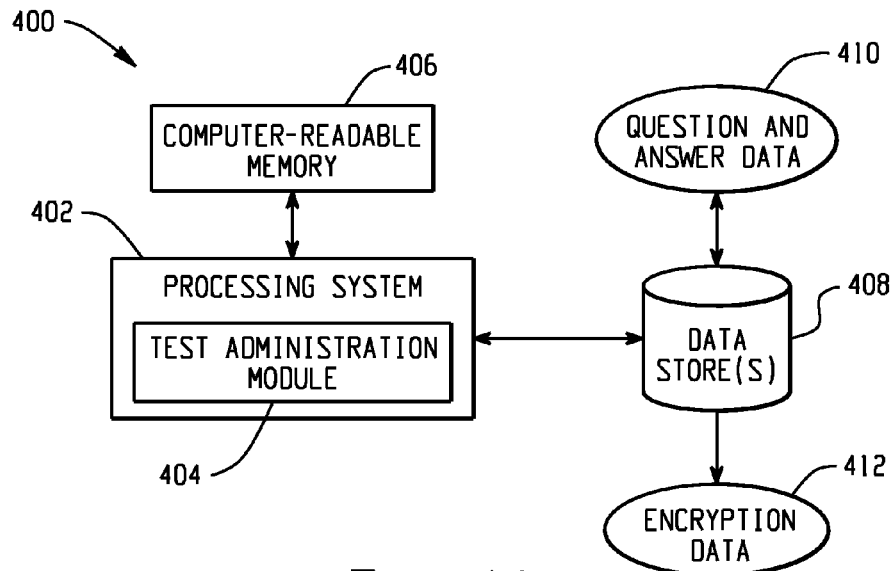
FIGS. 4A, 4B, and 4C depict example systems for use in implementing a method of administering a test using an electronic device.
Figure 4B:
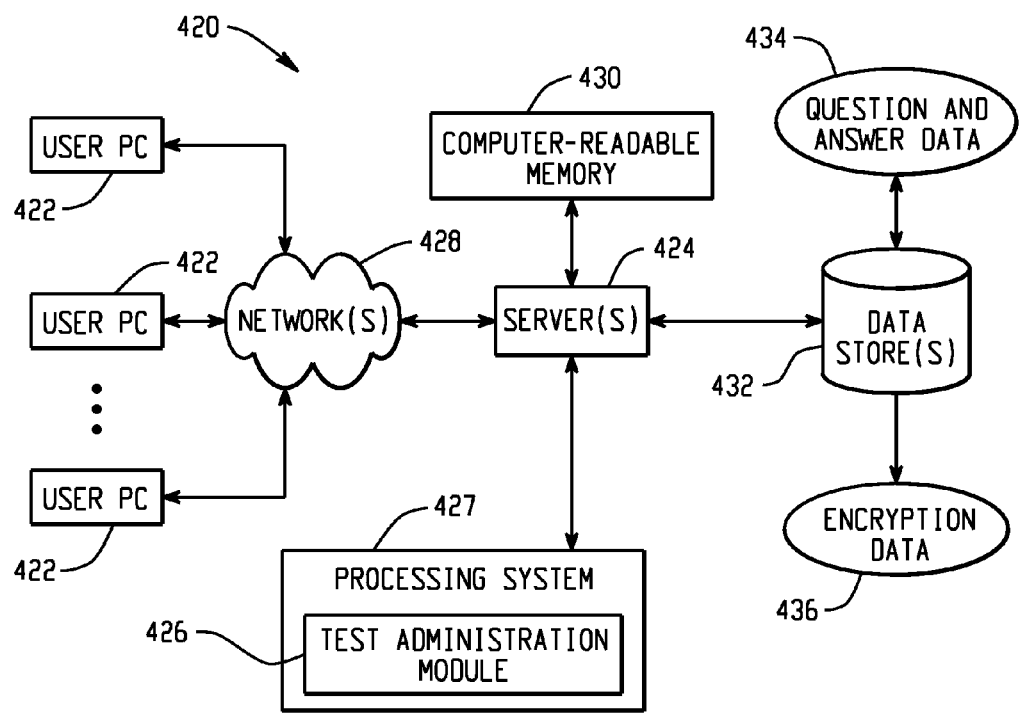
Figure 4C:
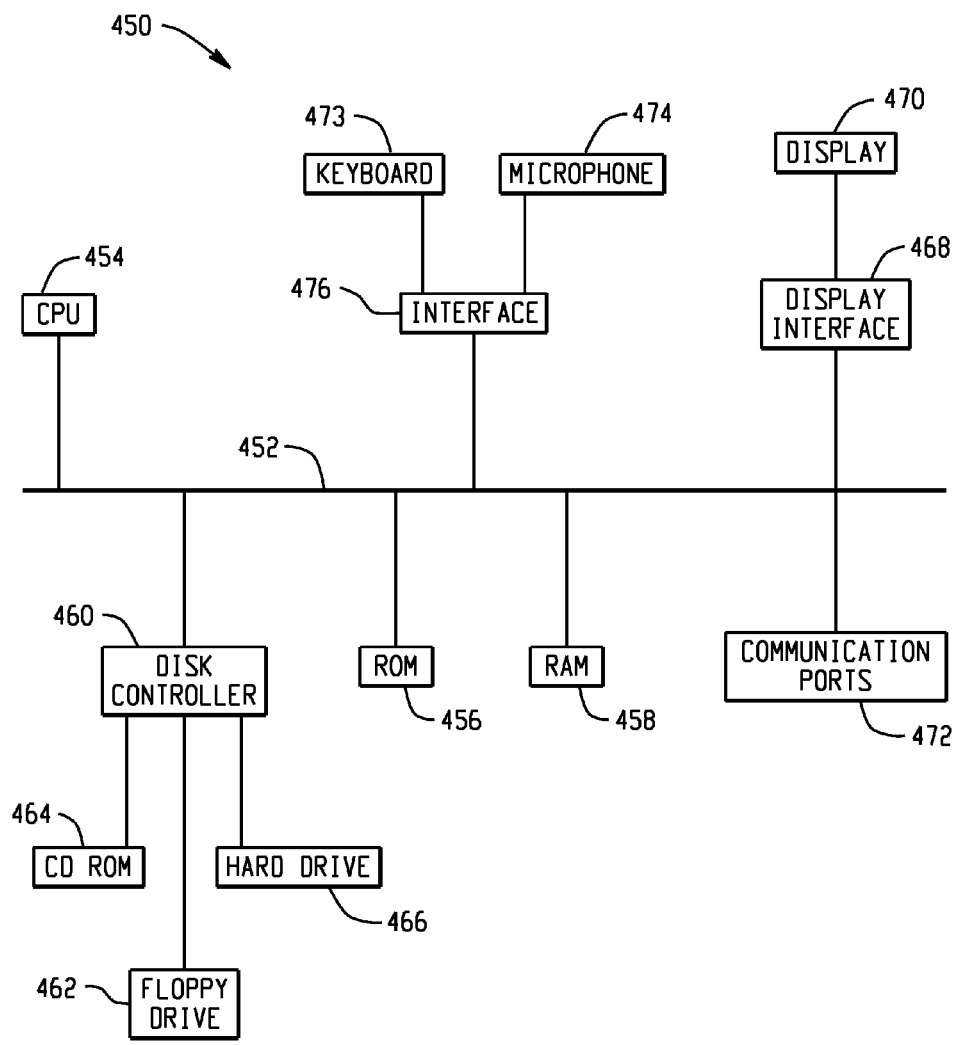

FIGS. 4A, 4B, and 4C depict example systems for use in implementing a method of administering a test using an electronic device. For example, FIG. 4A depicts an exemplary system 400 that includes a standalone computer architecture where a processing system 402 (e.g., one or more computer processors located in a given computer or in multiple computers that may be separate and distinct from one another) includes a test administration module 404 being executed on it. The processing system 402 has access to a computer-readable memory 406 in addition to one or more data stores 408. The one or more data stores 408 may include question and answer data 410 as well as encryption data 412.

FIG. 4B depicts a system 420 that includes a client server architecture. One or more user PCs 422 access one or more servers 424 running a test administration module 426 on a processing system 427 via one or more networks 428. The one or more servers 424 may access a computer readable memory 430 as well as one or more data stores 432. The one or more data stores 432 may contain question and answer data 434 as well as encryption data 436.

FIG. 4C shows a block diagram of exemplary hardware for a standalone computer architecture 450, such as the architecture depicted in FIG. 4A that may be used to contain and/or implement the program instructions of system embodiments of the present invention. A bus 452 may serve as the information highway interconnecting the other illustrated components of the hardware. A processing system 454 labeled CPU (central processing unit) (e.g., one or more computer processors at a given computer or at multiple computers), may perform calculations and logic operations required to execute a program. A non-transitory processor-readable storage medium, such as read only memory (ROM) 456 and random access memory (RAM) 458, may be in communication with the processing system 454 and may contain one or more programming instructions for performing the method of administering a test using an electronic device. Optionally, program instructions may be stored on a non-transitory computer readable storage medium such as a magnetic disk, optical disk, recordable memory device, flash memory, or other physical storage medium.

A disk controller 460 interfaces one or more optional disk drives to the system bus 452. These disk drives may be external or internal floppy disk drives such as 462, external or internal CD-ROM, CD-R, CD-RW or DVD drives such as 464, or external or internal hard drives 466. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 460, the ROM 456 and/or the RAM 458. Preferably, the processor 454 may access each component as required.

A display interface 468 may permit information from the bus 452 to be displayed on a display 470 in audio, graphic, or alphanumeric format. Communication with external devices may optionally occur using various communication ports 472.

In addition to the standard computer-type components, the hardware may also include data input devices, such as a keyboard 473, or other input device 474, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer implemented method of administering a test using an educational electronic device, comprising:
   providing an educational electronic device to a test-taker;
   registering the educational electronic device to the test-taker or a school, wherein the registering includes receiving identifying information from the test-taker and associating the educational electronic device with the test-taker using the identifying information;
   providing a test application via the educational electronic device, wherein the test application provides practice questions to the test-taker, and wherein the test application includes a practice user interface that is substantially similar to a live testing user interface;
   automatically receiving the test at the educational electronic device based on the registration of the educational electronic device, wherein the educational testing device is configured with a security protocol configured to (i) detect tampering with test data of the received test, and (ii) upon detection of the tampering, delete the test data and render the educational electronic device unusable;
   disabling an Internet connectivity capability of the educational electronic device upon receiving the test at the educational electronic device;
   storing the test in encrypted form on the educational electronic device;
   decrypting the test prior to administration of the test;
   administering the test to the test-taker via the educational electronic device using the live testing user interface;
   upon completion of the test administration, enabling the Internet connectivity capability and searching for an Internet connection for the educational electronic device; and
   upon a first detection of the Internet connection, automatically transferring, without prompting by a user, answers to the test to a test administration service, wherein the test and the answers to the test self-delete themselves from the electronic device after the transferring of the answers to the test administration service.

2. The method of claim 1, wherein the administering includes:
   displaying a test question on the educational electronic device;
   receiving an answer to the test question on the educational electronic device.

3. The method of claim 1, wherein the security protocol is configured to limit applications that can be run using the educational electronic device.

4. The method of claim 3, wherein the security protocol prevents any non-educational applications from being run using the educational electronic device.

5. The method of claim 3, wherein the security protocol prevents any non-educational applications from being run using the educational electronic device during a predetermined time period.

6. The method of claim 5, wherein the predetermined time period is during school hours.

7. The method of claim 5, wherein the predetermined time period is a scheduled test administration time period.

8. The method of claim 4, wherein the security protocol permits an e-textbook application to be run using the electronic device.

9. The method of claim 1, further comprising:
   disabling, using the one or more processors, communication capabilities and non-essential functionality of the educational electronic device prior to administration of the test;
   authenticating, using the one or more processors, an identity of the test-taker using the identifying information prior to administration of the test.

10. The method of claim 1, further comprising:
    executing, using the one or more processors, a battery life application configured to display an amount of time that the electronic device can be operated before a battery of the electronic device requires recharging, wherein the battery life application is further configured to alert the test-taker of a need to charge the educational electronic device prior to administration of the test, and wherein the alert is based on an expected amount of time that the test will run and the battery life of the educational electronic device remaining.

11. The method of claim 1, wherein the educational electronic device is a mobile computing device selected from the group consisting of: a tablet computer, a laptop computer, a smart phone, an e-reader, and a gaming device.

12. The method of claim 1, wherein the test application includes a practice test mode that simulates operation of the educational electronic device in live testing conditions.

13. The method of claim 1, wherein the test is provided using the same application that provides the practice questions.

14. The method of claim 1, wherein the practice test application and the security protocol are pre-loaded on the educational electronic device prior to the educational electronic device being provided to the test-taker.

15. The method of claim 1, wherein a key is provided to the test-taker by a proctor when the test is to be administered, wherein the test is decrypted when the key is entered into the educational electronic device.

16. The method of claim 1, wherein all test-takers of the test utilize substantially similar educational electronic devices.

17. The method of claim 1, further comprising displaying an advertisement on the educational electronic device, wherein revenue from the advertisement is provided to a provider of the educational electronic device to defer a cost of the educational electronic device.

18. The method of claim 17, wherein the educational electronic device is provided to students by a school district, a parent, or a foundation.

19. The method of claim 1, wherein the test-taker is prohibited from deleting the test application from the educational electronic device using operating system functionality by the security protocol.

20. The method of claim 1, further comprising detecting a location of the educational electronic device, wherein a check-in procedure is initialized by the educational electronic device automatically when the test-taker arrives at a testing location.

21. The method of claim 1, further comprising detecting a location of the educational electronic device, wherein a security action is taken if the educational electronic device is detected to be outside of an approved testing area.

22. The method of claim 21, wherein the security action includes: deleting the test, flagging the test-taker's violation of the approved testing area boundaries, or providing the test-taker with a score of zero.

23. The method of claim 1, wherein automatically receiving the test is further based on the registration of the test-taker to take the test.

24. The method of claim 1, further comprising uploading the test and identification of a list of students to receive the test to a server, wherein automatically receiving the test is further based on the list.

25. A system for administering a test using an educational electronic device, comprising:
one or more processors;
one or more non-transitory computer-readable storage mediums containing instructions configured to cause the one or more processors to perform operations including:
registering an educational electronic device to a test-taker or a school, wherein the registering includes receiving identifying information from the test-taker and associating the educational electronic device with the test-taker using the identifying information;
providing a test application via the educational electronic device, wherein the test application provides practice questions to the test-taker, and wherein the test application includes a practice user interface that is substantially similar to a live testing user interface;
automatically receiving the test at the educational electronic device based on the registration of the educational electronic device, wherein the educational testing device is configured with a security protocol configured to (i) detect tampering with test data of the received test, and (ii) upon detection of the tampering, delete the test data and render the educational electronic device unusable;
disabling an Internet connectivity capability of the educational electronic device upon receiving the test at the educational electronic device;
storing the test in encrypted form on the educational electronic device;
decrypting the test prior to administration of the test;
administering the test to the test-taker via the educational electronic device using the live testing user interface;
upon completion of the test administration, enabling the Internet connectivity capability and searching for an Internet connection for the educational electronic device; and
upon a first detection of the Internet connection, automatically transferring, without prompting by a user, answers to the test to a test administration service, wherein the test and the answers to the test self-delete themselves from the electronic device after the transferring of the answers to the test administration service.

26. A non-transitory computer program product for administering a test using an educational electronic device, tangibly embodied in a machine-readable non-transitory storage medium, including instructions configured to cause a data processing system to perform operations including:
registering an educational electronic device to a test-taker or a school, wherein the registering includes receiving identifying information from the test-taker and associating the educational electronic device with the test-taker using the identifying information;
providing a test application via the educational electronic device, wherein the test application provides practice questions to the test-taker, and wherein the test application includes a practice user interface that is substantially similar to a live testing user interface;
automatically receiving the test at the educational electronic device based on the registration of the educational electronic device, wherein the educational testing device is configured with a security protocol configured to (i) detect tampering with test data of the received test, and (ii) upon detection of the tampering, delete the test data and render the educational electronic device unusable;
disabling an Internet connectivity capability of the educational electronic device upon receiving the test at the educational electronic device;
storing the test in encrypted form on the educational electronic device;
decrypting the test prior to administration of the test;
administering the test to the test-taker via the educational electronic device using the live testing user interface;
upon completion of the test administration, enabling the Internet connectivity capability and searching for an Internet connection for the educational electronic device; and
upon a first detection of the Internet connection, automatically transferring, without prompting by a user, answers to the test to a test administration service, wherein the test and the answers to the test self-delete themselves from the electronic device after the transferring of the answers to the test administration service.

27. The system of claim 25, wherein the security protocol prevents any non-educational applications from being run using the educational electronic device.

28. The system of claim 25, wherein the instructions are configured to cause the one or more processors to perform the operations including:
disabling communication capabilities and non-essential functionality of the educational electronic device prior to administration of the test; and
authenticating an identity of the test-taker using the identifying information prior to administration of the test.

29. The system of claim 25, wherein the instructions are configured to cause the one or more processors to perform the operations including detecting a location of the educational electronic device, wherein a check-in procedure is initialized by the educational electronic device automatically when the test-taker arrives at a testing location.

30. The system of claim 25, wherein the instructions are configured to cause the one or more processors to perform the operations including detecting a location of the educational electronic device, wherein a security action is taken if the educational electronic device is detected to be outside of an approved testing area.

31. The non-transitory computer program product of claim 26, wherein the security protocol prevents any non-educational applications from being run using the educational electronic device.

32. The non-transitory computer program product of claim 26, wherein the instructions are configured to cause the data processing system to perform the operations including:
   disabling communication capabilities and non-essential functionality of the educational electronic device prior to administration of the test; and
   authenticating an identity of the test-taker using the identifying information prior to administration of the test.

33. The non-transitory computer program product of claim 26, wherein the instructions are configured to cause the data processing system to perform the operations including detecting a location of the educational electronic device, wherein a check-in procedure is initialized by the educational electronic device automatically when the test-taker arrives at a testing location.

34. The non-transitory computer program product of claim 26, wherein the instructions are configured to cause the data processing system to perform the operations including detecting a location of the educational electronic device, wherein a security action is taken if the educational electronic device is detected to be outside of an approved testing area.

* * * * *